US007284870B2

(12) United States Patent
Toyota et al.

(10) Patent No.: US 7,284,870 B2
(45) Date of Patent: Oct. 23, 2007

(54) LIGHTING APPARATUS AND IMAGE PICK-UP APPARATUS WITH LIGHTING

(75) Inventors: Makoto Toyota, Saitama (JP); Tatsuo Seki, Saitama (JP); Yasuhiko Fukunaga, Saitama (JP); Shuji Shikano, Tochigi (JP)

(73) Assignee: Moritex Corporation, Tokyo (JP)

( * ) Notice: Subject to any disclaimer, the term of this patent is extended or adjusted under 35 U.S.C. 154(b) by 61 days.

(21) Appl. No.: 10/940,720

(22) Filed: Sep. 15, 2004

(65) Prior Publication Data

US 2005/0063167 A1 Mar. 24, 2005

(30) Foreign Application Priority Data

Sep. 17, 2003 (JP) ............................. 2003-323990

(51) Int. Cl.
*G03B 15/02* (2006.01)

(52) U.S. Cl. .......................................... 362/3; 362/239

(58) Field of Classification Search .................... 362/3, 362/239

See application file for complete search history.

(56) References Cited

U.S. PATENT DOCUMENTS 6,238,060 B1 * 5/2001 Bourn et al. .................... 362/3
6,630,888 B2 * 10/2003 Lang et al. ................. 362/800
6,830,359 B2 * 12/2004 Fleury ........................ 362/237
2005/0007776 A1 * 1/2005 Monk et al. ................ 362/239

FOREIGN PATENT DOCUMENTS

JP 2001-153808 8/2001

OTHER PUBLICATIONS

U.S. Appl. No. 10/941,101 to Toyota et al.
U.S. Appl. No. 10/941,101, filed Mar. 24, 2005, Toyota et al.

* cited by examiner

*Primary Examiner*—Ali Alavi
*Assistant Examiner*—William J Carter
(74) *Attorney, Agent, or Firm*—Greenblum & Bernstein, P.L.C.

(57) ABSTRACT

A lighting apparatus in which plural light emitting devices for illuminating light to an object to be illuminated from the periphery thereof are put to light control, and a control device is provided for controlling light to the light emitting devices on every segment divided isogonally with respect to the lighting center at which the light is focused by a control device, wherein the control device 6 comprises an illuminance distribution setter 7 that sets the illuminance on every segments $S_1$ to $S_4$ individually in accordance with the start position of a vector that represents the lighting direction to the lighting center F on the XY coordinate plane D with the lighting center F being as an origin $P_0$, and a light controller 9 that reads out the illuminance on every segment from the illuminance distribution setter 7 in accordance with the input data from a two dimensional data input device 8 that sets the start position and controls the light.

18 Claims, 5 Drawing Sheets

LIGHTING APPARATUS AND IMAGE PICK-UP APPARATUS WITH LIGHTING

BACKGROUND OF THE INVENTION

Field of the Invention

The present invention concerns a lighting apparatus having plural light emitting devices for illuminating light to an object to be illuminated from the periphery thereof and a control device for controlling light of the light emitting devices on every segment partitioned isogonally with respect to the lighting center where lighting light gathers, as well as an image pick-up apparatus provided with such a lighting apparatus.

In assembling lines or production lines for various kinds of electronic parts, images of an object for inspection are picked-up by an image pick-up apparatus using image pick-up devices such as CCDs and the images are judged with naked eyes or put to image processing for inspection of products.

In the image pick-up apparatus of this type, a lighting apparatus for illuminating light from the periphery of an optical axis to an object is disposed integrally so that images can be picked-up at a certain brightness irrespective of the ambient brightness.

By the way since such an object generally has a sterical configuration, it sometimes causes reflection depending on the lighting direction making it difficult to see, or a portion to be observed becomes invisible and, accordingly, it is sometimes demanded for observation while increasing the illuminance in a specified direction.

Further, in a case of picking-up images of an object obliquely from above, since a portion near the object is brightened and a portion apart therefrom is dimmed under uniform lighting, it is necessary to pick-up images while changing the illuminance distribution.

In view of the above, it has been proposed recently a lighting apparatus of controlling light of plural light emitting elements that illuminate light to the lighting center on every segment divided isogonally with respect to the lighting center thereby controlling the illuminance distribution (refer to JP-A No. 2001-153808).

In this apparatus, several-lighting patterns prepared by optionally setting illuminance on every segment are previously stored, and lighting is conducted at an optional illuminance distribution by selecting the lighting pattern.

For example, when a top portion of a semi-sphere is cut in parallel with the bottom surface to form a spherical zone, a number of LEDs are arranged on the inner circumference surface of the zone, which are divided into front and back and right and left segments each with a center angle of 90° and illuminance is set for each of the segments, it is possible to illuminate light, for example, at 100% illuminance for the entire direction thereof, or at an optional illuminance distribution at 100% for frontal portion—at 80% for both right and left portions, and 60% illuminance for back portion.

However, since the lighting patterns are set individually from the 1st to $n_{th}$ patterns, an operator who handles the lighting apparatus for the first time can not instantly recognize the content of a certain specified lighting pattern to be selected.

Further, when the operator intends for lighting by using a desired lighting pattern, the operator has to confirm all the lighting patterns registered already from $1_{th}$ to $n_{th}$ pattern as to whether the selected lighting pattern has already been registered or not, so that the lighting pattern is often registered doubly without adequate confirmation.

Further, when images of an object are picked-up from above obliquely, while it is necessary to lower the illuminance of a segment near the object, since the illuminance for each of the segments can optionally be set, the illuminance distribution for each of the segments is set at random irrespective of the tilting of the image pick-up optical axis but based on subjective factors such as operator's experience or instinct, so that the image pick-up conditions may sometimes vary depending on operators.

SUMMARY OF THE INVENTION

Then, it is a technical subject of the present invention to provide a lighting apparatus capable of lighting-up respective segments each containing plural light emitting devices by previously set determinate illuminance distribution in accordance with the lighting direction or in accordance with the tilting of the image pick-up optical axis with no-trouble-of setting the-illuminance on every lighting pattern.

The foregoing subject can be attained in accordance with a lighting apparatus in which plural light emitting devices are provided for illuminating light to an object to be illuminated from the periphery thereof, and a control device is provided for controlling light to the light emitting devices on every segment divided isogonally with respect to the lighting center at which the light is focused, wherein the control device comprises;

an illuminance distribution setter that sets the illuminance on each of the segments individually in accordance with the start position of a vector that represents the lighting direction to the lighting center on the XY coordinate plane with the lighting center being as an origin, and a light controller that reads out the illuminance on every segment from the illuminance distribution setter in accordance with the input data from a two dimensional data input device that sets the start position and controls the light.

Further, the-present invention also provides an image pick-up apparatus with a lighting apparatus, in which an image pick-up camera for picking up images of an object is integrally provided with a lighting apparatus that illuminates light from the periphery of the image pick-up optical axis to the object, wherein the lighting apparatus comprises plural light emitting devices that illuminate light to a focal point on the image pick-up optical axis as a lighting center from the periphery thereof, and a control device that controls light on each of segments formed by dividing the light emitting devices isogonally with respect to the lighting center, the control device comprises;

an illuminance distribution setter that sets the illuminance on each of the segments individually in accordance with the start position of a vector that represents the lighting direction to the lighting center on the XY coordinate plane with the lighting center being as an origin, and a light controller that reads out the illuminance on every segment from the illuminance distribution setter in accordance with the input data from a two dimensional data input device that sets the start position and controls the light.

According to the lighting apparatus of the present invention, when an optional coordinate point on the XY coordinate axis is specified as a start position for the vector that represents the lighting direction to the lighting center by the two dimensional data input device such as a joy stick, since the illuminance in accordance with the coordination point is read out from an illumination distribution chart set on every segment, the illuminance is decided determinatively on every segment in accordance with the lighting direction.

Further, in a case where the lighting apparatus described above is provided integrally to the image pick-up apparatus, not only the images can be picked-up under an identical lighting condition in accordance with the lighting direction as described above but also the illuminance distribution is decided determinatively on every segment by the tilting angle of the image pick-up apparatus by using a sensor that detects the angle of inclination of the image pick-up optical axis as the two dimensional data input device.

Accordingly, the present invention provides-an excellent effect capable of lighting always at an identical illuminance distribution for the illuminance distribution so long as the lighting direction or the tilting angle is identical while saving the-trouble of individually setting the illuminance on every segment in accordance with the lighting direction and with no effect of operator's subjective factor only if the light direction or the tilting angle is specified.

BRIEF DESCRIPTION OF THE DRAWINGS

Preferred embodiments of the present invention will be described in details based on the drawings, wherein.

DESCRIPTION OF PREFERRED EMBODIMENTS

Figure 1:
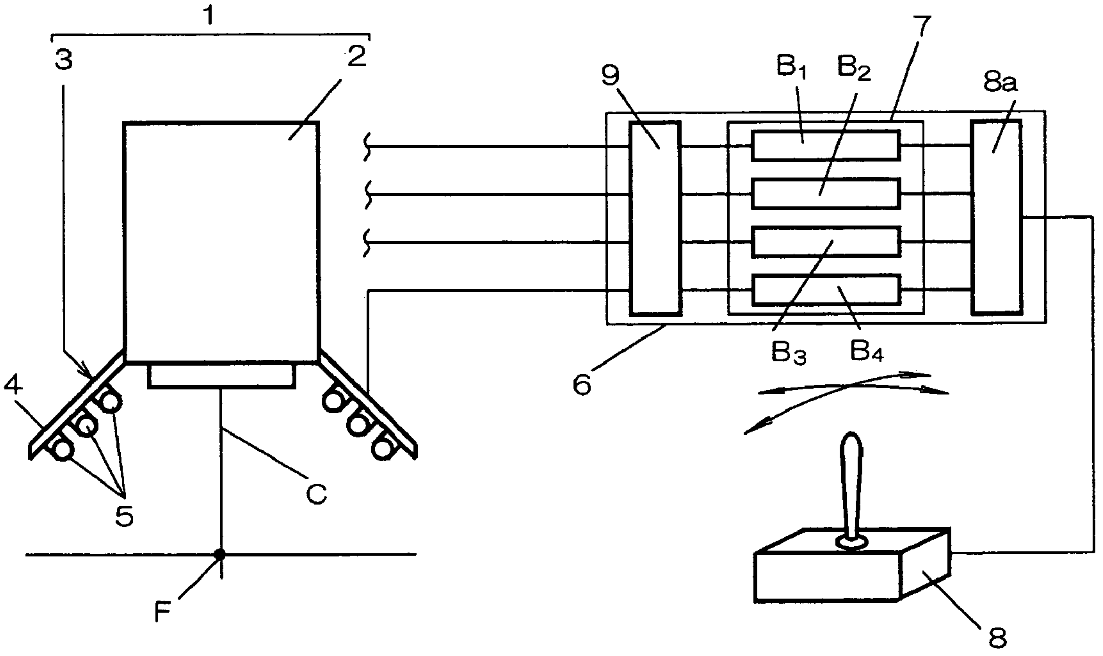
FIG. 1 is a explanatory view showing an image pick-up apparatus according to the present invention.
Figure 2:
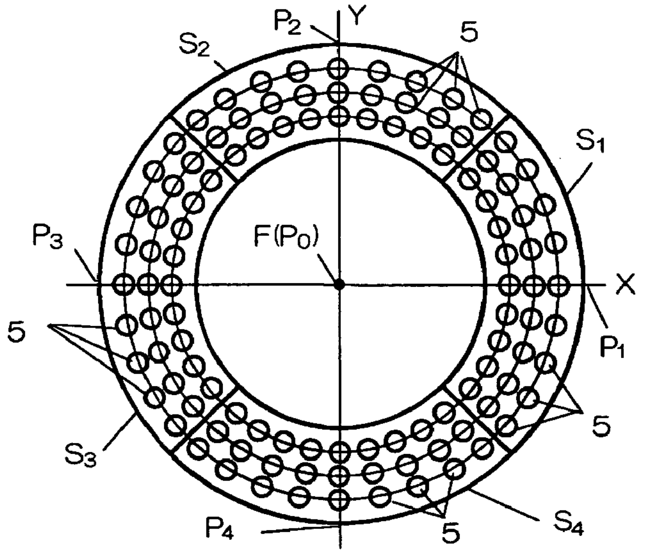
FIG. 2 is a plan view thereof.

In the present invention, the purpose of lighting-up each of segments with a previously set determinative illuminance distribution in accordance with the lighting direction can be attained by deciding the illuminance on every segment based on the two dimensional coordinate data representing the lighting direction.

In an image pick-up apparatus 1 provided with a lighting apparatus, a lighting apparatus 3 for illuminating light from the periphery of an image pick-up optical axis C to an object is attached integrally to the top end of an image pick-up camera 2 in which image pick-up devices are disposed.

In the lighting apparatus 3, a number of LEDs (light emitting devices) 5, 5—are mounted on a frustoconically tapered substrate 4 for illuminating light to a focal point on an image pick-up optical axis as a lighting center F from the periphery of the optical axis, and a control device 6 is provided for controlling the illuminance distribution by controlling light of LEDs 5, 5—on each of segments $S_1$ to $S_4$ formed by isogonally dividing the substrate 4 each for the center angle, for example, of 90° with respect to the lighting center F.

The control device 6 comprises an illuminance distribution setter 7 that individually sets illuminance on every segment $S_1$ to $S_4$ on an XY coordinate plane D expressing the start position of a vector that represents the lighting direction to the lighting center F as a two dimensional data corresponding to the start position of the vector, a data reader 8*a* that reads input data when the start position is inputted by a two dimensional data input device such as a joy stick 8 that sets the start position, and a light controller 9 that reads out the illumination for each of segments $S_1$ to $S_4$ from the illuminance distribution setter 7 in accordance with the two dimensional data and controlling the light.

Figure 3:
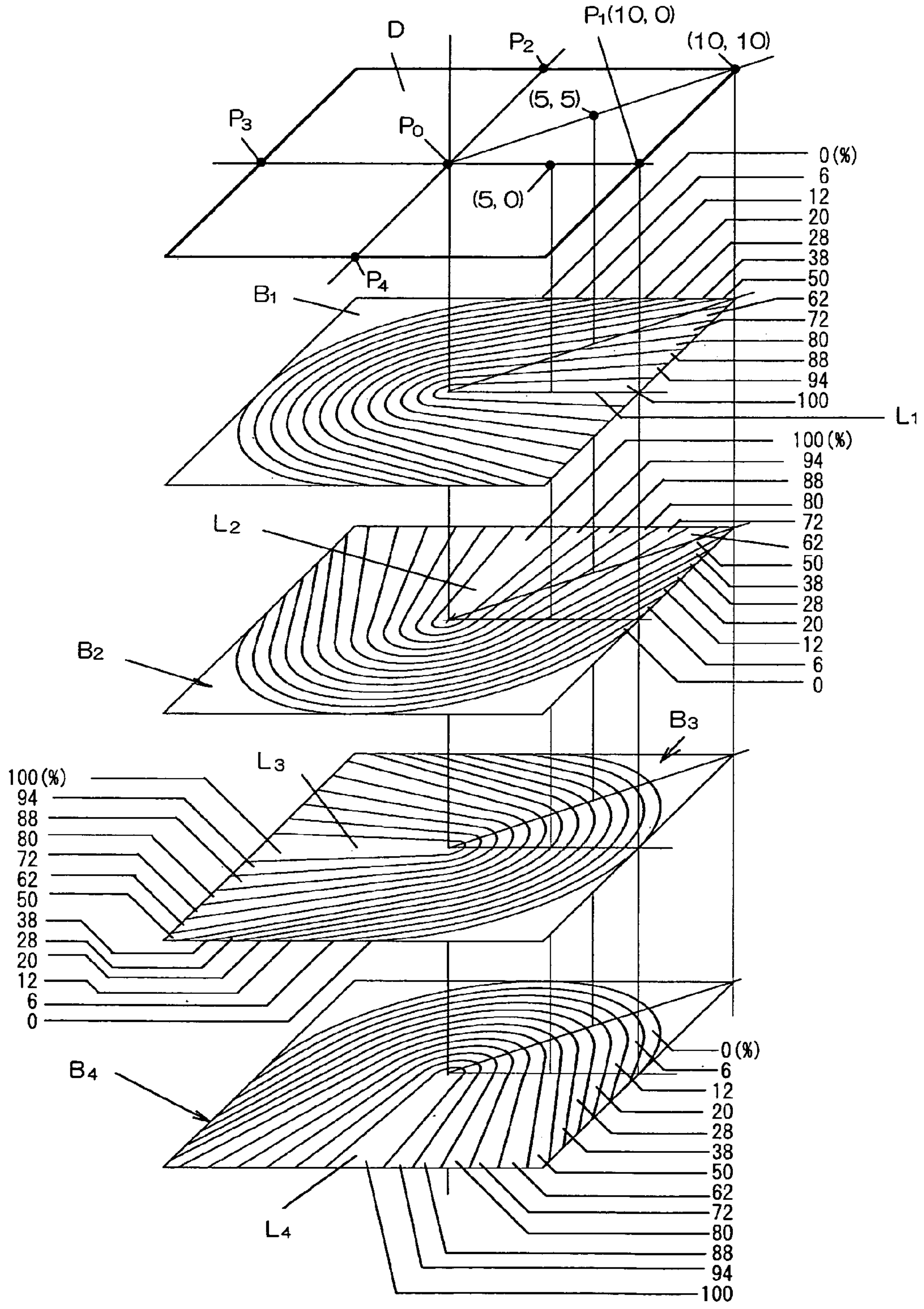
FIG. 3 is an explanatory view showing a relation between an illuminance distribution for each segment and XY coordinate.

The illuminance distributions $B_1$ to $B_4$ for individual segments $S_1$ to $S_4$ set by the illuminance distribution setter 7 are set on the XY coordinate D as shown in FIG. 3.

The illuminance distribution $B_1$ for the segment $S_1$ is set on the XY coordinate plane D such that the lighting optical axis $L_1$ directing from the origin $P_0$ corresponding to the lightening center F to the center $P_1$ for the segment $S_1$ aligns with the positive direction on the axis X and the illuminance is set such that the illuminance lowers as it recedes from the lighting optical axis $L_1$ assuming the illuminance on the lighting optical axis $L_1$ set from the center position $P_1$ to the origin $P_0$ for the segment $S_1$ on the XY coordinate plane D as 100%.

The illuminance distributions $B_2$ to $B_4$ for other segments $S_2$ to $S_4$ also have quite identical distribution shape excepting that the direction of the lighting optical axis $L_2$ to $L_4$ from the origin $P_0$ corresponding to the lighting center F to the center $P_2$ to $P_4$ for each of segments $S_2$ to $S_4$ is different.

That is, the illuminance distributions $B_1$ to $B_4$ are set on the XY coordinate plane being overlaid in a state displaced each by 90° with respect to the origin $P_0$ as a center such that their lighting optical axis $L_1$ to $L_4$ align with the positive direction and the negative direction of the axis X and the axis Y.

Then, when the joy stick 8 is turned down, for example, from the vertically erected state to the right (positive direction along axis X) to change the ordinate as: (0, 0)–(5, 0)–(10, 0), the illuminance distribution changes as: ($S_1$, $S_2$, $S_3$, $S_4$)=(100, 100, 100, 100)–(100, 50, 50, 50)–(100, 0, 0, 0) and the light illuminated uniformly from the entire periphery changes the lighting direction finally such that the light is illuminated only from the right.

Further, when the joy stick 8 is turned down from the state erected vertically to the direction to right-front at 45°(Y=X) to change the coordinate as: (0, 0)–(5, 5)–(10, 10), the illuminance distribution changes as: ($S_1$, $S_2$, $S_3$, $S_4$)=(100, 100, 100, 100)–(72, 72, 28, 28)–(50, 50, 0, 0), and the light illuminated so far uniformly from the entire circumference is finally illuminated from the right side and from the front each by 50%, and the lighting direction changes such that the light is illuminated in the direction from right front at 45°.

Accordingly, in this embodiment, when the joy stick 8 is tilted to the lighting direction where the illuminance is intended to be increased, since the illuminance for each of the segment $S_1$ to $S_4$ is decided determinatively, it is not necessary to set the illuminance individually but it may suffice to decide only the lighting direction.

Further, in a case where a memory 10 is provided in the control device 6 to store the illuminance for each of the segments $S_1$ to $S_4$ with respect to an optional lighting direction set by the joy stick and when LEDs 5, 5—in each of the segments $S_1$ to $S_4$ is caused to emit light based on the stored data, the lighting condition can be reproduced reliably with no effect of subtle difference for the tilting of the joy stick 8.

Further, the lighting condition can be reproduced also by displaying the 2-dimensional data inputted from the joy stick 8 as the data for the lighting direction and manipulating the joy stick 8 so as to align with the data for lighting direction.

The present invention is not restricted only to a case of fixing the image pick-up apparatus and controlling the illuminance distribution in accordance with the lighting direction of the illumination light, but the illumination light can be illuminated uniformly to the object also in a case of tilting the image pick-up optical axis C.

Figure 4:
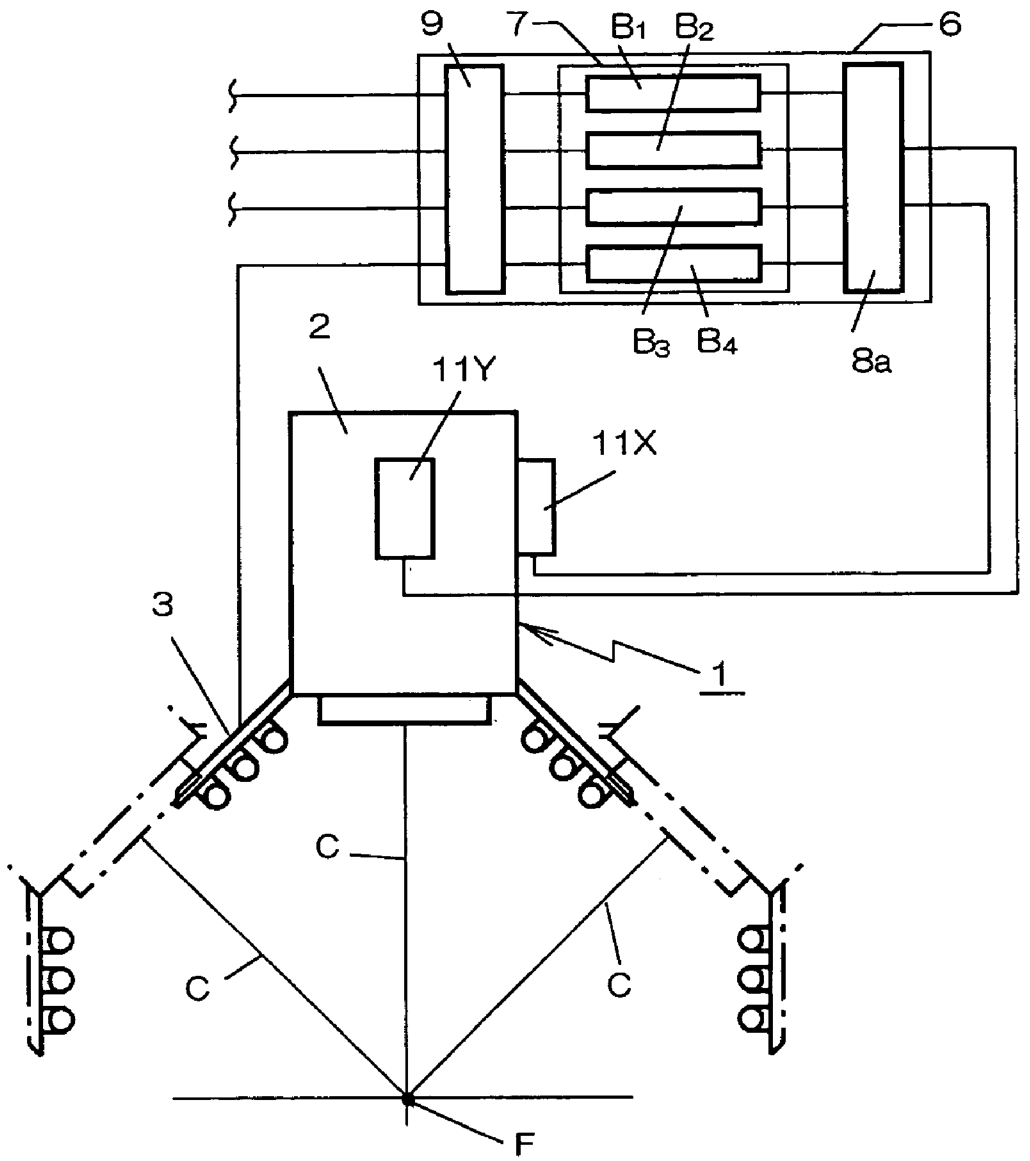
FIG. 4 is an explanatory view showing another embodiment according to the invention.

FIG. 4 is an explanatory view showing such an embodiment. In this embodiment, an image pick-up apparatus 1 is placed tiltably so that the images of an object can be picked up from any optional direction, and tilting angle sensors 11*x* and 11*y* are used for detecting the tilting angle along the direction XY of the image pick-up optical axis C as the 2-dimensional data input device.

Figure 5:
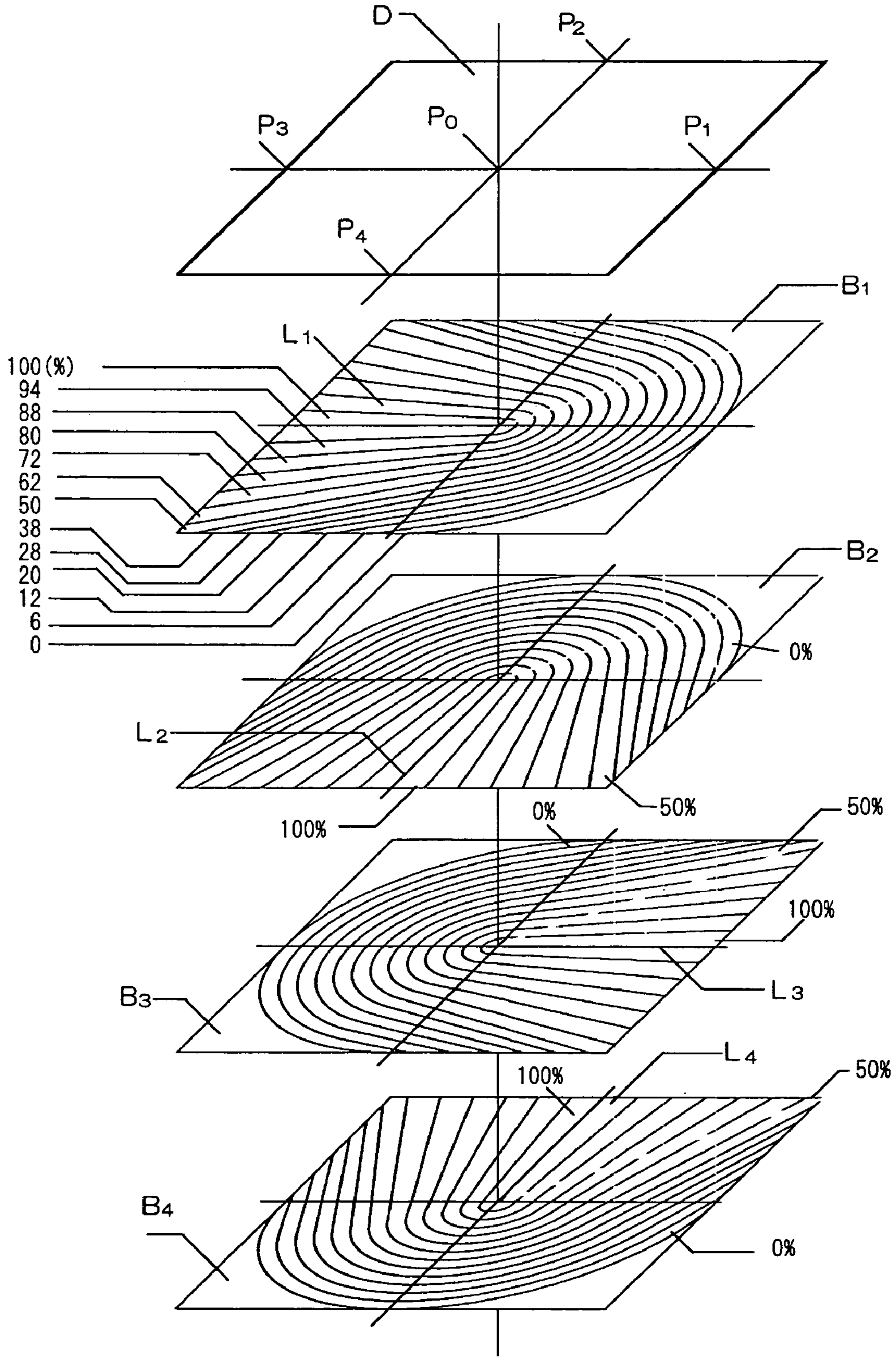
FIG. 5 is an explanatory view showing an illuminance distribution thereof.

In the illuminance distribution setter 7, illuminance is set individually for each of segments $S_1$ to $S_4$ in accordance with the tilting angle of the image pick-up optical axis C instead of the lighting direction described above and each of the illuminance distributions $B_1$ to $B_4$ is set such that-the illumination light is illuminated uniformly to the object by dimming the light from the--direction of tilting when the image pick-up optical axis C is tilted as shown in FIG. 5.

Thus, the data for the angle of inclination along the direction of the axis X and the direction of the axis Y detected by the tilting angle sensors 11*x* and 11*y* are read by the data reader 8*a* and when the two dimensional data is inputted to the illuminance distribution setter 7, since the illuminance for each of the segments $S_1$ to $S_4$ is decided determinatively, the illuminance for each of the segments $S_1$ to $S_4$ capable of obtaining the uniform illumination light is automatically decided by merely tilting the image pick-up apparatus 1, with no trouble for setting the illumination at all.

As has been described above according to the invention, since the illuminance for each of the segments $S_1$ to $S_4$ is decided determinatively by designating the illumination direction or the tilting of the image pick-up optical axis by the two dimensional data input device such as the joy stick 8 or the tilting angle sensors 11*x*, 11*y*, it can provide an excellent effect capable of conducting lighting always with an identical illuminance distribution so long as the lighting direction or the tilting angle is identical with no room for operator's subjective judgement, for example, to decide the degree of illuminance distribution in view of the degree of tilting.

The invention is not restricted only to the case of dividing the substrate 4 into four segments $S_1$ to $S_4$ each for 90° of center angle but may be divided into optional number of sections so long as they are sected isogonally.

In this case, it may suffice to set the illuminance distributions in accordance with the number of segments to the illuminance distribution center 7 and it may also suffice to input the lighting direction or the tilting of the image pick-up optical axis C as the two dimensional data.

Figure 6:
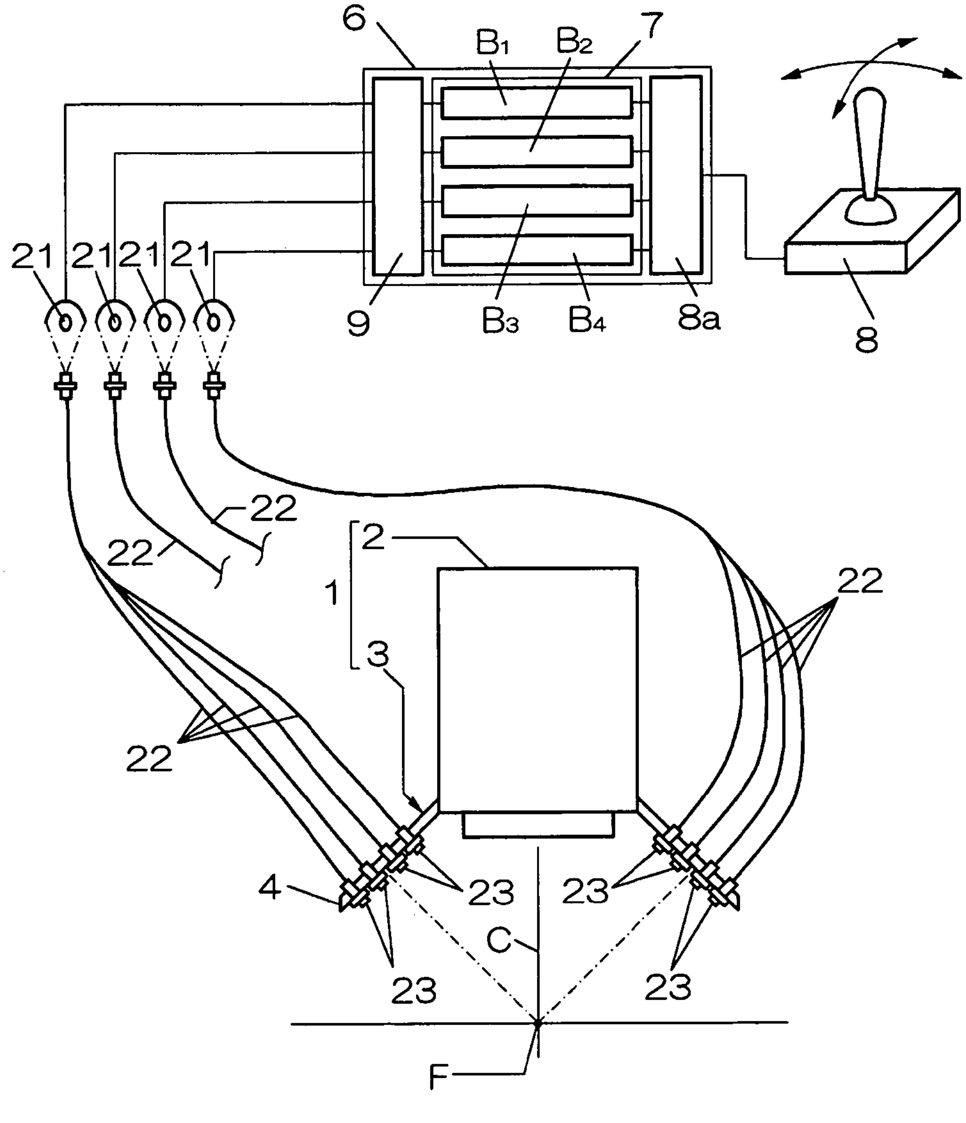
FIG. 6 is an explanatory view showing another embodiment according to the present invention.

While description has been made to the case of using LEDs 5, 5—as the light emitting devices, the invention is not restricted only thereto but light emission ends 23—of optical fibers 22—that guide light to every segment from plural light controllable external light sources 21—may be arranged on the substrate 4 instead of the LEDs 5, 5—as shown in FIG. 6.

The present invention is suitable to such an application of illuminating light from an optimal lighting direction without tilting the lighting apparatus or uniformly illuminating light to an object when an image pick-up apparatus is tilted irrespective of the tilting angle in a case of inspecting products or identifying products by image processing in production lines.

The present disclosure relates to subject matter contained in priority Japanese Patent Application No. 2003-323,990 filed on Sep. 17, 2003, the contents of which is herein expressly incorporated by reference in its entirety.

What is claimed is:

1. A lighting apparatus, comprising:

a plurality of light emitting devices configured to illuminate an object from positions peripheral to the object, the plurality of light emitting devices being disposed in a formation comprising a plurality of arcuate segments, each segment comprising a plurality of light emitting devices, wherein the plurality of arcuate segments are arranged in a generally frusto-conical shape such that the plurality of light emitting devices form a plurality of concentric circles; and a controller configured to receive a multi-dimensional input signal from a multi-dimensional data input device and to individually control illumination of each of the segments based on the received multi-dimensional input signal, wherein the controller comprises an illuminance distribution setter that sets a lighting center as an origin and sets a center of each segment as a segment center, the illuminance distribution setter setting a respective illuminance distribution corresponding to each segment on a XY coordinate plane, the illuminance of each segment being set to a maximum value when a point on the XY coordinate plane is on a lighting optical-axis that connects the lighting center and segment centers, and the illuminance of each segment decreasing from the maximum value when the point recedes from the lighting optical-axis.

2. The lighting apparatus according to claim 1, wherein the light emitting devices comprise light emission ends of optical fibers that guide light from plural light controllable external light sources to every segment.

3. The lighting apparatus according to claim 1, wherein the two dimensional data input device is a joy stick that determines two dimensional data based on the tilting angle thereof in the XY coordinate plane.

4. The lighting apparatus according to claim 1, wherein the multi-dimensional data input device comprises a two-dimensional data input device, and the multi-dimensional input signal comprises a two-dimensional input signal.

5. The lighting apparatus according to claim 1, wherein the controller comprises substantially identical distribution profiles for each of the segments.

6. The lighting apparatus according to claim 5, wherein the distribution profiles are offset from each other by multiples of 90 degrees.

7. An image pick-up apparatus for picking up images of an object, comprising an image pick-up camera integrated with a lightening apparatus that illuminates light from a periphery of an image pick-up optical axis to the object, the lightening apparatus comprising:

a plurality of light emitting devices configured to illuminate the object from positions peripheral to the object, wherein the plurality of light emitting devices being disposed in a formation comprising a plurality of arcuate segments; each segment comprising a plurality of light emitting devices, wherein the plurality of arcuate segments are arranged in a generally frusto-conical shape such that the plurality of light emitting devices form a plurality of concentric circles; and a controller configured to receive a multi-dimensional input signal from a multi-dimensional data input device and to individually control illumination of each of the segments based on the received multi-dimensional input signal wherein the controller comprises an illuminance distribution setter that sets a lighting center as an origin and sets a center of each segment as a segment center, the illuminance distribution setter setting a respective illuminance distribution corresponding to each segment on a XY coordinate plane, the illuminance of each segment being set to a maximum value when a point on the XY coordinate plane is on a lighting optical-axis that connects the lighting center and segment centers, and the illuminance of each segment decreasing from the maximum value when the point recedes from the lighting optical-axis.

8. The image pickup apparatus according to claim 7, wherein the controller comprises substantially identical distribution profiles for each of the segments.

9. The image pickup apparatus according to claim 8, wherein the distribution profiles are offset from each other by multiples of 90 degrees.

10. The image pickup apparatus according to claim 7, wherein the multi-dimensional data input device comprises a two-dimensional data input device, and the multi-dimensional input signal comprises a two-dimensional input signal.

11. A lighting apparatus, comprising:

a plurality of light emitting devices configured to illuminate an object from positions peripheral to the object, the plurality of light emitting devices being disposed in a formation comprising a plurality of arcuate segments, each segment comprising a plurality of light emitting devices, wherein the plurality of arcuate segments are arranged in a generally frusto-conical shape such that the plurality of light emitting devices form a plurality of concentric circles; and a controller configured to receive a multi-dimensional input signal from a tilting angle sensor that detects the tilting angle of an image pick-up optical axis in an XY coordinate plane, the controller further configured to individually control illumination of each of the segments based on the received multi-dimensional input signal, wherein the controller comprises an illuminance distribution setter that sets a lighting center as an origin and sets a center of each segment as a segment center, the illuminance distribution setter setting a respective illuminance distribution corresponding to each segment on a XY coordinate plane, the illuminance of each segment being set to a maximum value when a point on the XY coordinate plane is on a lighting optical-axis that connects the lighting center and segment centers, and the illuminance of each segment decreasing from the maximum value when the point recedes from the lighting optical-axis.

12. The lighting apparatus according to claim 11, wherein the controller comprises substantially identical distribution profiles for each of the segments.

13. The lighting apparatus according to claim 12, wherein the distribution profiles are offset from each other by multiples of 90 degrees.

14. The lighting apparatus according to claim 11, wherein the multi-dimensional data input device comprises a two-dimensional data input device, and the multi-dimensional input signal comprises a two-dimensional input signal.

15. An image pick-up apparatus with a lighting apparatus wherein an image pick-up camera being integrated to a lightening apparatus, which illuminates light from the periphery of the image pick-up optical axis to the object, for picking up images of an object, the lightening apparatus comprising:

a plurality of light emitting devices configured to illuminate the object from positions peripheral to the object, wherein the plurality of light emitting devices being disposed in a formation comprising a plurality of arcuate segments; each segment comprising a plurality of light emitting devices, wherein the plurality of arcuate segments are arranged in a generally frusto-conical shape such that the plurality of light emitting devices form a plurality of concentric circles; and a controller configured to receive a multi-dimensional input signal from a tilting angle sensor that detects the tilting angle of an image pick-up optical axis in a XY coordinate plane, the controller further configured to individually control illumination of each of the segments based on the received multi-dimensional input signal, wherein the controller comprises an illuminance distribution setter that sets a lighting center as an origin and sets a center of each segment as a segment center, the illuminance distribution setter setting a respective illuminance distribution corresponding to each segment on a XY coordinate plane, the illuminance of each segment being set to a maximum value when a point on the XY coordinate plane is on a lighting optical-axis that connects the lighting center and segment centers, and the illuminance of each segment decreasing from the maximum value when the point recedes from the lighting optical-axis.

16. The image pickup apparatus according to claim 15, wherein the controller comprises substantially identical distribution profiles for each of the segments.

17. The image pickup apparatus according to claim 16, wherein the distribution profiles are offset from each other by multiples of 90 degrees.

18. The image pickup apparatus according to claim 15, wherein the multi-dimensional data input device comprises a two-dimensional data input device, and the multi-dimensional input signal comprises a two-dimensional input signal.

* * * * *